UNITED STATES PATENT OFFICE.

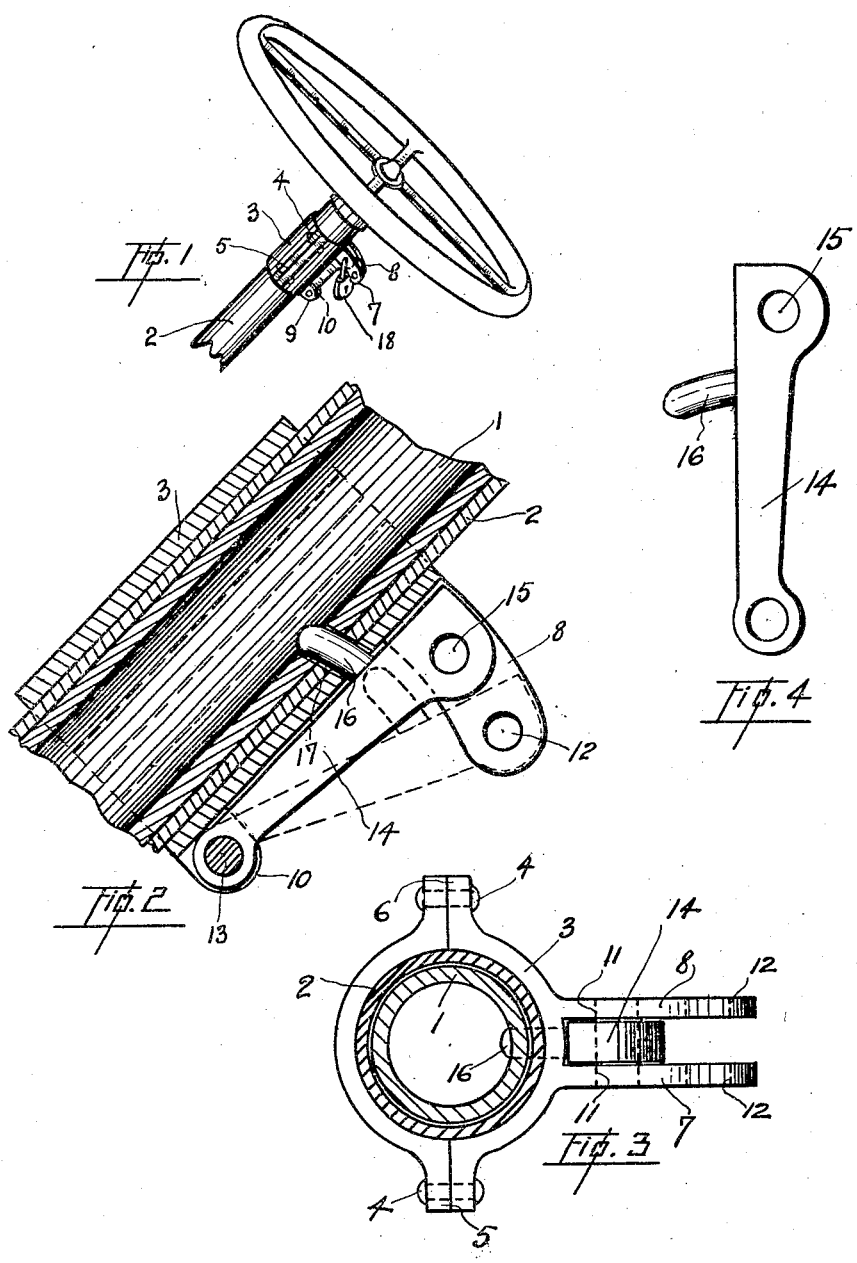

PAUL JOSEPH COTÉ, OF EBURNE, BRITISH COLUMBIA, CANADA.

AUTOMOBILE-LOCK.

1,236,913.  Specification of Letters Patent.  Patented Aug. 14, 1917.

Application filed November 18, 1916. Serial No. 132,189.

*To all whom it may concern:*

Be it known that I, PAUL JOSEPH COTÉ, a subject of the King of Great Britain, and a resident of the town of Eburne, in the Province of British Columbia, Canada, have invented certain new and useful Improvements in Automobile-Locks, of which the following is a specification.

My invention relates to improvements in automobile locks, and the object of my invention is to provide a simple, practical, and efficient device adapted for attachment to the steering column, the use of which enables the steering shaft to be locked to the steering column when the car is stationary, the front wheels being inclined to the right or left, as the case may be, and thus prevent the wheels being brought into the straight ahead position, thus rendering it impossible for the car to be driven ahead until the lock is withdrawn. A further object is to provide a device of this nature which is very strong and capable of being assembled in place with great facility, and which cannot be readily tampered with or destroyed.

I attain these objects by the construction illustrated in the accompanying drawings in which—

Figure 1 is a view illustrating the practical embodiment of my invention.

Fig. 2 is a part sectional view of the assembled device.

Fig. 3 is a plan view, the steering shaft and column being shown in section.

Fig. 4 is a detail view of the locking arm.

Similar figures of reference indicate similar parts throughout the several views.

1 indicates the steering shaft of an automobile and 2 the steering column, while 3 indicates a clamp adapted to encircle the column and to be rigidly secured thereto by rivets 4 passed through the lugs 5 and 6 of the clamp. Extending outwardly from the clamp at its upper end and parallel to each other are arms 7 and 8, and formed integrally with the clamp at its lower end and in alinement with the arms 7 and 8 are lugs 9 and 10. The arms 7 and 8 are provided with openings 11 and 12, the openings 11 being adjacent the clamp body and the openings 12 being adjacent the outer extremities of the arms.

13 indicates a pin secured into the lugs 9 and 10, on which pin is swingably mounted the locking arm 14, the upper end of which moves between the arms 7 and 8 and is provided with an opening 15 which registers respectively with the openings 11 and 12 when the arm is in the locked or the unlocked positions, as hereinafter described. 16 indicates a pin secured into the inner face of the arm 14 and adapted to pass into and through an opening 17, formed in and extending through the clamp body, the steering column, and the steering shaft, as shown in Fig. 2, when the wheels are inclined to one side, and which opening is formed after the device is secured in place.

The manner in which the device is used and operates will be apparent, as it will be seen that the clamp 3, which is formed in two halves, may be placed on the steering column in any suitable position and permanently secured thereto by the rivets 4 or any other suitable means. The opening 17 has then to be formed, and the position of that part of the opening which extends through the steering shaft is determined by the rule of the road obtaining in the district in which the car is used. For instance, if the left hand side of the thoroughfare is the proper side, then in stopping the car it will be drawn up to the curb with the wheels inclined to the left, and it is with the steering shaft in this position that the opening 17 is formed by drilling through the clamp body, the steering column, and the steering shaft so that it is continuous through these three elements only when the wheels are inclined the desired amount to the left. The reverse is the case when the proper side is the right hand side, as then the wheels are inclined the desired amount to the right before drilling the opening 17.

Now, the hole 17 being formed, and the wheels inclined to the left or right, as the case may be, it will be seen that the locking arm 14 may be swung inwardly until the pin 16 passes into the opening 17 and engages the steering column and the steering shaft, the opening 15 then registering with the openings 11 in the arms 7 and 8, so that the locking arm and pin may be maintained in the locking position, that is, the inmost position, by means of a strong padlock, indicated by the numeral 18 in Fig. 1, the shackle of which passes through the openings 11 and 15, and is then locked by the driver.

As a very strong padlock can be used, and as the device itself can be placed in a position where it is not readily accessible to breaking tools, it will be seen that it would be a very different operation to destroy the lock and one which could not be attempted in a public thoroughfare with any chance of success. Further, as the pin 16 is of very strong material, such as being formed integrally with the arm 14, which may be a drop forging, it cannot be sheared off by turning the steering wheel, as the wheel would twist off before the pin would give. The front wheels being thus maintained inclined to the right or left, as the case may be, the car can neither be driven off nor towed, as, until the device is unlocked, the wheels cannot be brought into the straight ahead position, which can only be done when the padlock is disengaged from the openings 11 and 15, when the arm 14 may be swung outwardly to carry the pin 16 clear of the steering shaft and permit operation of the same. In the outmost position of the arm 14 the opening 15 registers with the openings 12 of the arms 7 and 8, allowing the shackle of the padlock to be passed therethrough and locked, thus maintaining the arm 14 in its outmost position when the car is running.

What I claim as my invention is:

1. A device of the class described comprising, a clamp member adapted for attachment to an automobile steering column and provided with outwardly extending arms at its upper end having openings adjacent their inner and outer ends and an arm swingably attached to its lower end, said arm being provided on its inner face with a projecting member and having an opening adjacent its upper end arranged to register respectively with either the inner and outer openings of the arms aforesaid when the arm is swung to its inmost or outmost positions.

2. A device of the class described comprising a clamp member connected to the steering column having an arm having orifices therein, a wedge shaped arm swingably mounted on the clamp having an enlarged eyelet designed to register with the orifices of the arm, and a curved pin on the non-inclined face of the arm adapted to pass through the steering shaft.

Dated at Vancouver, B. C., this 4th day of November, 1916.

PAUL JOSEPH COTÉ.